Patented Mar. 30, 1943

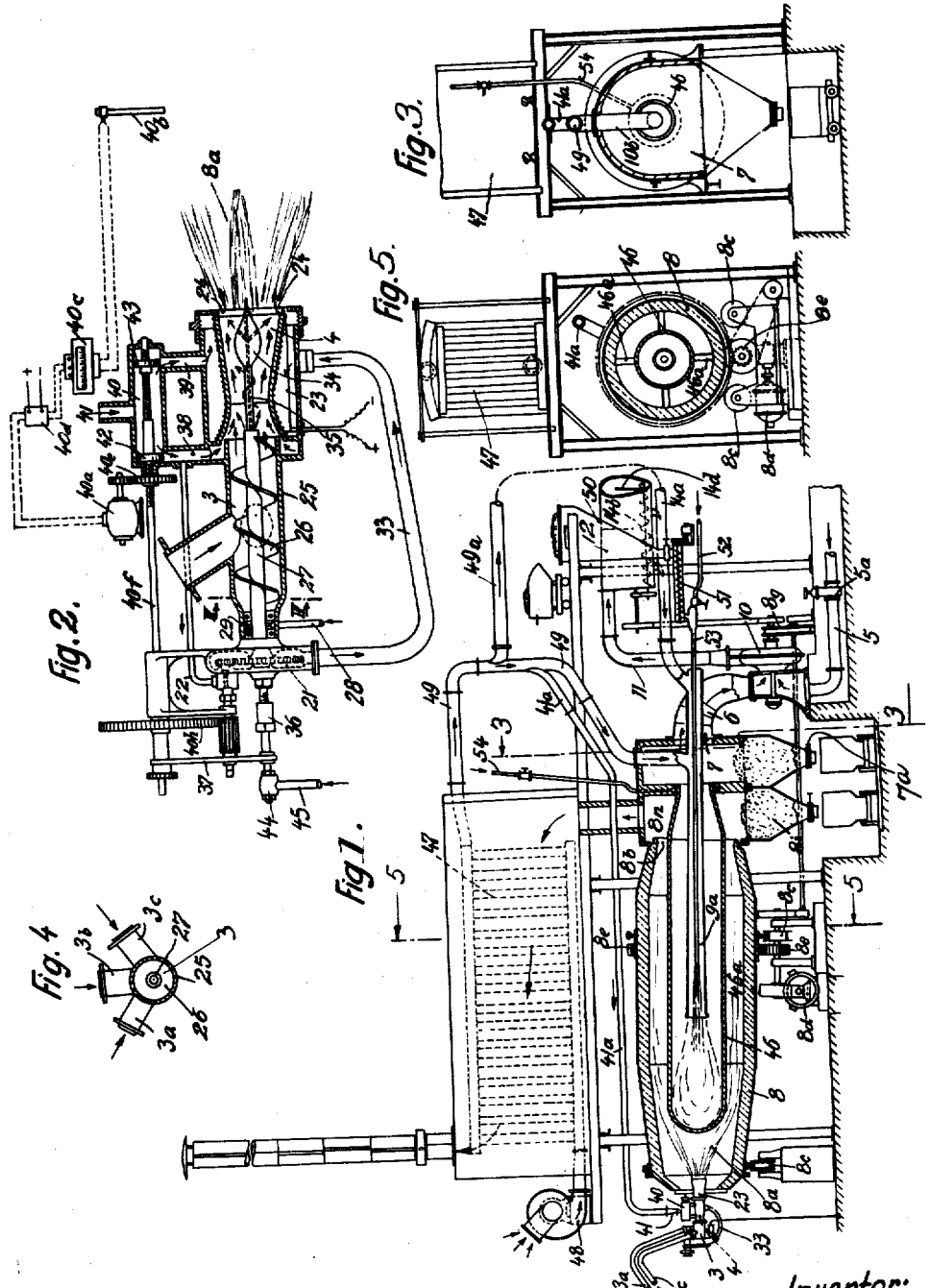

2,315,123

UNITED STATES PATENT OFFICE 2,315,123

METALLURGICAL APPARATUS

Julius Lohse, Berlin-Wilmersdorf, Germany;
vested in the Alien Property Custodian Application October 15, 1940, Serial No. 361,314
In Germany September 1, 1937

10 Claims. (Cl. 266—18)

The invention of my present application which is a continuation in part of my former application Serial No. 227,488, filed August 30, 1938, relates to apparatus for carrying out a continuous metallurgical process for the dressing of raw materials in a flame chamber, more particularly for the desulphurisation, chlorination, roasting or drying of ores, concentrates or other minerals, and has for its object to provide improvements in apparatus and processes of this kind, by which there is rendered possible a uniform dressing of the material in one operation, for example in the case of a roasting process even up to the extent of dead roasting, at the same time all manual operations together with any parts conducted through the material during the roasting operation and consequently subjected to considerable wear being avoided. Other advantages reside in the completely automatically regulable nature of the dressing process, which owing to a special returning means provided in accordance with the invention necessitates merely a short body or flame chamber and thus assists considerably to reduce the cost of the plant.

For the desulphurisation and roasting of ores, concentrates or other products containing sulphur it has already been proposed, apart from the roasting processes previously usual in open kilns and stalls, to perform this roasting by hand in reverberatory furnaces of the material-advancing type with direct or indirect heating. It is also known to perform the manual operation by means of rakes suspended on chains, and on the other hand to make the arrangement of the furnaces such that roasting is performed on the different levels of a circular shaft furnace.

The disadvantage of apparatus operating with rakes consists on the one hand in the fact that the rakes are unable to convey the material down to the last grain, within range of the roasting action, so that a complete roasting of the material is only possible by continuous repetition of the roasting process and even then it is not of a regular kind. On the other hand the disintegrated material under the movement of the rakes, transfers its fine particles of dust to the current of heating gas and over-saturates this current, so that the roasting effect is obstructed.

My present invention comprises novel apparatus in the use of which according to my method ore and ore dust are introduced in such a way into the hottest region of the roasting chamber, that the large surfaces of the dust particles are continuously acted upon by the roasting agent. The problem with which the invention is primarily concerned consists in maintaining the dust and other ore particles during the roasting operation in intimate contact with the roasting agent and the solution to the problem resides in injecting the mixture for roasting into a hot chamber whilst maintaining the current of roasting gas under pressure and performing the complete roasting operation in this hot current.

According to my invention, the ore, in a finely divided condition, is injected in common with the roasting agent under pressure into a hot chamber, floating in the current of roasting gas, and is again sucked off from this chamber whilst the current is maintained.

My invention proposes the injection of the ore in common with the roasting agent into an externally heated retort and is then sucked off.

In addition my invention also makes provision for the fact that, if necessary, the gases sucked up from the furnace and bearing the particles of ore floating therein are again mixed with fresh air and introduced into the furnace anew. In the use of an indirectly heated retort as herein set forth the sucked up particles are again conducted to the same inlet aperture through which they were originally admitted.

Owing to the method according to my invention of performing roasting in the hot current of a roasting flame and also by reason of the possibility of repeating the roasting operation one or more times in this current, it is possible to roast down the sulphur to small percentages, even to the extent of dead roasting, which result has not been attained with the apparatus previously in use.

According to my invention it is also proposed, after completion of the roasting operation, to conduct the current of gas with the particles of dust to a filtering device, whilst the large pieces precipitated in the furnace as a result of agglomerating are conducted by the rotary movement of the furnace into a collection hopper.

An additional advantage can be obtained accoridng to my invention by providing the furnace with a regulable burner, which can be adjusted completely automatically by the use of known regulating means. By the use of a completely automatic device of this nature the roasting operation can be carried out independently of the skill of the man in charge, so that a certain roasting process having a certain roasting action can be adjusted once and for all solely on the basis of tests carried out in the laboratory.

My invention is illustrated by way of example in the accompanying drawing, in which Fig. 1 shows diagrammatically in elevation and partly in section a plant constructed in accordance with the present invention in which the roasting is accomplished within an indirectly heated retort.

Figure 2 is a view partly in elevation and partly in vertical longitudinal section, upon an enlarged scale, of the burner structure illustrated diagrammatically and in side elevation in Figure 1.

Fig. 3 is a sectional view on the line 3—3 of Fig. 1.

Figure 4 is a vertical transverse section taken substantially upon the line 4—4 of Figure 2.

Fig. 5 is a sectional view on the line 5—5 of Fig. 1.

Upon reference to Figure 1 of the drawing there is shown an elongated furnace structure 2 at one end of which is located a burner structure which comprises an air chamber 23 which encloses the nozzle structure 4 and opens at its forward end into the furnace 8, around the nozzle 4 at 24. Extending through the rear end of the air chamber and into the rear of the nozzle 4 is a screw conveyor tube 25 in which is a screw conveyor 26 supported upon a tubular shaft 27. Into the screw conveyor there open the three inlets 3b, 3a and 3c, and gas and coal dust are fed into the conveyor tube 25 by way of the inlets 3a and 3c respectively.

Fuel oil under pressure is fed through the pipe 28 to a suitable feed ring 29 surrounding the rear end of the tubular screw conveyor shaft 27 from which ring the fuel passes into the tubular shaft by way of apertures not especially marked. This fuel is discharged at the forward end of the shaft in the burner nozzle 4 where it mixes with the gas, powdered coal and minerals to be blown into this furnace.

The rear end of the screw shaft is connected with a rotor 21 which is driven by compressed air supplied through the pipe line 22 through a suitable nozzle against blades forming a part of the rotor 21, and by this means the screw is turned to feed the several materials to the burner. The air employed for driving the rotor 21 passes out of the rotor casing into the pipe line 33 and is discharged in the air chamber 23, as shown.

Disposed within the forward end of the burner nozzle 4 is a needle 34 which is adjustable in the opening of the burner nozzle 4 to regulate the size of the same, and this needle is supported upon a stem 35 which passes through the tubular shaft 27 and through the rotor 21 where it is threadably connected in a suitable supporting nut 36 so that upon being turned as by means of a control belt 37 which encircles the rear end of this stem 35, it may be fed forwardly or retracted in the burner nozzle if desired.

The numerals 38 and 39 designate air feed channels which lead from a compressed air chest 40 respectively to the rear end of the burner nozzle 4 and the air chamber 23. The numeral 41 designates the air inlet for the air chest. The aforementioned air pipe 22 is branched off the channel 38. Within the air chest 40 are valves 42 and 43 which are under the control of suitable automatic regulating mechanism for governing the flow of air through the feed channels 38 and 39. Such regulating mechanism comprising, for instance, a pair of gear wheels 40e and a motor 40a, controlled from a pyrometer 40b arranged within the chamber wall 8, with indicator 40c, over an impulse producer 40d, and may incidentally be used for also regulating in accordance with the air admission into the nozzle 4. the air admission to the rotor 21, by means of an extended shaft 40f and a gearing 40h, and the position of the needle 34 by actuating the belt 37, whereby the stem 35 is advanced or retracted.

The stem 35 carrying the needle 34 is tubular and means is provided, as indicated at 44, for carrying thereinto through a pipe line 45 connected with a suitable source of supply, any gases which it may be found desirable to introduce such as oxidizing or chlorinating gases.

At the opposite end of the furnace there is a discharge section 8b, into which projects a refractory blast pipe 9 extending approximately to the base of the two cones of the double-conical revolving furnace 8. This blast pipe has compressed fresh air supplied to the same by suitable means through pipe 14a. A fan 10 is connected, by means of pipe 6, centrally to a chamber 7. At 7a lumps, cakes and coarser particles can be discharged into trucks, the material in the discharge funnel of chamber 7 always forming an airtight and gastight seal.

Disposed axially in the furnace 8 is a tubular retort 46, which is preferably furnished with thin walls, and is supported within the furnace upon radial walls 46a, so as to revolve with the furnace. The retort 46 is heated within the latter externally by the flame 8a of the burner 3, 4. No mineral ores are fed into the burner nozzle 4 but merely air, coal and fuel oil, therefore, when operating the apparatus as illustrated in Fig. 1 the inlet 3b (Fig. 4) will be closed.

The waste gases of the flame 8a are preferably utilised by the provision of a heat exchange device 47, into which the waste gases pass from the chamber 8n through a connection, whereas at the opposite end by means of a special blower 48 air is passed through and preheated in 47 and then introduced through a pipe 49 and by way of a pipe 9a into the retort 46 as hot oxidizing air. This pipe 9a, extends longitudinally into the furnace chamber and into the retort 46 to conduct into the retort the ore mixture which is supplied from a suitable hopper 50, by a mechanical conveyor 51, into the pipe 53, from which it is discharged into the blast pipe 9a and the retort 46 by an air blast provided through a pipe 52. Here the ore material, flying upon the bottom of the revolving retort, is heated to the desired degree by the burning gases within the furnace chamber 8. The roasting gases with the particles of ore floating therein are sucked up continuously by the blower 10, following which they pass through pipe 11 into the chamber 12 where the dust and coarser particles are separated and returned into the retort 46 by means of pipe 14a. In this construction the hot air, which is used as a moving agent, is fed through the branch pipe 49a, from pipe 49 of the air heating device 47. From the retort 46 the residues, primarily metal oxides, are discharged continuously into the chamber 7 and from there into a truck as indicated. As the furnace 8 and the retort 46 are arranged with an inclination of approximately 3–5% in relation to the horizontal, the discharge is facilitated thereby. To prevent the entrance of furnace gases through the narrow slit encircling the neck of the revolving retort 46 within the wall partitioning the chamber 7 from the interior space of the furnace 8, air under pressure is blown into the said slit from a suitable source through pipe 54, thus sealing the slit.

The hot air issuing from the heat-exchange device 47, may also be utilized for the supply of hot air to the burner 3, 4 through the pipe 41a into its air inlet 41.

My invention as employed for carrying out the chemical-thermal treatment for desulphurisation purposes may also be used for performing other chemical thermal conversion processes, within the bounds of protection secured by my present application.

What I claim as new and desire to secure by Letters Patent:

1. An apparatus for the continuous metallurgical treatment of raw ore materials in a flame chamber, more particularly for the desulphurisation, chlorination, roasting and drying of ores; comprising, an elongated furnace, a retort disposed within the said furnace, a burner in said furnace externally heating the said retort, a pipe extending into and discharging into the said retort, material supplying means connected with the said pipe, blower means for moving material through the pipe and injecting the material from the pipe into the retort, the retort having a discharge opening through which also partly roasted material is withdrawn by suction, means for sucking of the gas from the retort with particles of material floating therein, and means for effecting the discharge from the retort of the coarser pieces of the material.

2. An apparatus for the continuous metallurgical treatment of raw ore materials in a flame chamber, comprising an elongated cylindrical furnace supported for rotation on its long axis, an elongated retort disposed within and extending longitudinally of the furnace and rotating therewith, the end of the retort being open for the discharge of material therefrom, the other end of the retort being closed, a pipe extending into the retort through the open end thereof for discharge thereinto toward said closed end, material supplying means connected with said pipe, a burner arranged to direct a heating flame longitudinally into the said furnace toward the closed end of the retort for externally heating said retort, and blower means for sucking off gases from the said open end of the retort with particles of material floating therein and returning such material into the retort adjacent the closed end thereof for further roasting.

3. An apparatus for the continuous metallurgical treatment of raw materials in a flame chamber, comprising, an elongated cylindrical furnace supported for rotation on its long axis, a burner arranged to discharge a flame longitudinally into the furnace through one end thereof, an elongated retort secured within said furnace so as to rotate therewith, the retort extending longitudinally of the furnace towards its burner, means for introducing ore materials longitudinally into the furnace for suspension roasting within the retort, means for discharging coarse ore particles through the end of the retort remote from the hottest zone therein, means for drawing off gases from the last mentioned end of the retort together with lighter ore particles suspended therein, a pipe operatively coupled with said draw-off means and blower and extending through the said last mentioned end of the retort longitudinally into the same to discharge at its other end into the hottest zone of the retort, said pipe receiving he drawn-off particles and having the same forced therethrough back into the furnace for further roasting, means for separating from the sucked-off gases the ore particles suspended therein, and means for returning the separated ore particles into the retort, said separation means being arranged within said pipe connected to said draw-off means and blower.

4. An apparatus for the continuous metallurgical treatment of raw ore materials in a flame chamber, comprising, an elongated cylindrical furnace supported for rotation on its long axis, a burner arranged to discharge a flame longitudinally into the furnace through one end thereof, an elongated retort secured within said furnace so as to rotate therewith, the retort extending longitudinally of the furnace towards its burner, means for introducing ore materials longitudinally into the furnace for suspension roasting within the retort, means for discharging coarse ore particles through the end of the retort remote from the hottest zone therein, means for drawing off gases from the last mentioned end of the retort together with lighter ore particles suspended therein, a blower operatively coupled with said draw-off means, a pipe connected at one end with said draw-off means and blower and extending through the said last mentioned end of the retort longitudinally into the same to discharge at its other end into the hottest zone of the retort, said pipe receiving the drawn-off particles and having the same forced therethrough back into the furnace for further roasting, means for separating from the sucked-off gases the ore particles suspended therein, means for returning the separated ore particles into the retort, said separating means being arranged within said pipe connected to said draw-off means and blower, and means for utilizing the waste gases of the furnace for heating the air supplied to the burner and retort, said last means comprising a blower for moving the heated air.

5. Metallurgical apparatus of the character described, comprising an elongated substantially horizontally disposed furnace, a retort disposed longitudinally within and closed off from the furnace and opening at one end through an end of the furnace, the other end of the retort being closed, means for heating the retort in the furnace from the closed end and at maximum temperature at the closed end of the retort, means for discharging material into the closed end of the retort for roasting out of contact with the flame, means at said one end for receiving roasted material from the retort, and means for drawing off gases and lighter particles of roasted material suspended therein from the said one end of the retort and separating the same and returning said particles into the retort for re-roasting.

6. Metallurgical apparatus of the character described, comprising a furnace, a retort within and closed off from the furnace and having an outlet opening, means for applying heat externally only to the retort in the furnace, means for discharging material into the retort for roasting, means at said outlet opening for receiving roasted material from the retort, a heat transfer unit operatively connected with the furnace to receive hot combustion gases therefrom, means for heating air in said unit and conducting the heated air into the retort with said material, means for removing gases and gas-borne particles from the retort, means for separating said particles from the gases, and means for returning said particles into the retort with said heated air for re-roasting.

7. Metallurgical apparatus of the character described, comprising an elongated furnace open at one end, an elongated retort disposed longitudinally in the furnace and having one end open and extended through the open end of and out of communication with the furnace and having its other end within the furnace and closed, means supporting the retort for rotation on its longitudinal axis for effecting the working of material therethrough toward the open end, means within the furnace for heating the retort, means for discharging material into the retort for roasting, means at the open end of the retort for receiving roasted material therefrom, a suction fan connected with the open end of the retort for drawing off gases and air-borne particles, means connected with the suction fan for effecting the separation of the gases and particles, and means for returning the particles into the retort for re-roasting.

8. Metallurgical apparatus of the character described, comprising an elongated furnace open at one end, an elongated retort disposed longitudinally in the furnace and having one end open and extended through the open end of the furnace and having its other end closed, means supporting the retort for rotation on its longitudinal axis for effecting the working of material therethrough toward the open end, means within the furnace for heating the retort, means for discharging material into the retort for roasting, means at the open end of the retort for receiving roasted material therefrom, a suction fan connected with the open end of the retort for drawing off gases and air-borne particles, means connected with the suction fan for effecting the separation of the gases and particles, a heated air conducting pipe leading into said retort, means for introducing said particles into said pipe, and means for heating air and discharging the same through said pipe into the retort and for employing the heated air for carrying said particles through the pipe into the retort for re-roasting.

9. Metallurgical apparatus of the character described, comprising a furnace, an elongated inclined retort having its major portion extending into the furnace, and supported for axial rotation, the inner end of the retort being closed and the outer end of the retort being open, means for effecting rotation of the retort, means within the furnace for heating the retort, a heated gas escape for the furnace, a heat exchange unit into which said heated gas escape discharges, said unit including a hot air outlet pipe for carrying off air heated in the unit by the gases, a pipe extending into and axially of the retort and discharging therein adjacent the closed end thereof, means for discharging ore material into the retort through and from the inner end of the second-mentioned pipe, means for drawing off gases and air-borne ore particles from the retort, means for separating the particles from the gases, means for returning the separated particles to the retort through the second-mentioned pipe, and means for employing a portion of the hot air flowing from the outlet pipe of said unit for effecting such return of the particles into the retort through the second-mentioned pipe.

10. Metallurgical apparatus of the character described, comprising a furnace, an elongated retort having its major portion extended into the furnace, the retort being closed at its inner end and having its outer end open, means within the furnace for heating the retort, means for discharging ore material into the retort toward the closed end thereof, a heat transfer unit having an inlet connected with the furnace to receive heated gases therefrom and having an outlet pipe through which air heated by the gases in the unit is conducted, a pipe extending into the open end of the retort and discharging at its inner end toward the closed end of the retort and having connection with said heated air outlet of the heat transfer unit, means for drawing off gases and gas-borne particles from the open end of the retort, a separator into which the gases and particles are discharged by the draw-off means, said separator comprising a chamber in which the particles settle, and means connecting the lower part of the chamber with the second-mentioned pipe for effecting the drawing of the particles from the chamber by the heated air passing through the pipe toward the retort whereby said particles are returned to the retort for re-roasting.

JULIUS LOHSE.